(12) United States Patent
Fawcett et al.

(10) Patent No.: US 11,509,607 B2
(45) Date of Patent: Nov. 22, 2022

(54) CHATBOT SYSTEM

(71) Applicant: SAGE GLOBAL SERVICES LIMITED, Newcastle upon Tyne (GB)

(72) Inventors: Alexander Christopher Fawcett, Newcastle upon Tyne (GB); Jacqueline Dawn Peacock, Richmond (CA)

(73) Assignee: SAGE GLOBAL SERVICES LIMITED, Newcastle upon Tyne (GB)

(*) Notice: Subject to any disclaimer, the term of this patent is extended or adjusted under 35 U.S.C. 154(b) by 105 days.

(21) Appl. No.: 16/219,282

(22) Filed: Dec. 13, 2018

(65) Prior Publication Data

US 2019/0199657 A1   Jun. 27, 2019

(30) Foreign Application Priority Data

Dec. 13, 2017   (GB) ...................................... 1720798

(51) Int. Cl.
| | | |
|---|---|---|
| G06F 15/16 | (2006.01) | |
| H04L 51/02 | (2022.01) | |
| G06Q 10/10 | (2012.01) | |
| G06F 9/54 | (2006.01) | |
| H04L 51/046 | (2022.01) | |
| H04L 51/222 | (2022.01) | |

(52) U.S. Cl.
CPC .............. *H04L 51/02* (2013.01); *G06F 9/542* (2013.01); *G06Q 10/1095* (2013.01); *G06Q 10/1097* (2013.01); *H04L 51/046* (2013.01); *H04L 51/222* (2022.05)

(58) Field of Classification Search
CPC ....... H04L 51/02; H04L 51/20; H04L 51/046; G06Q 10/1095; G06Q 10/1097; G06F 9/542
USPC ......................................... 709/203, 205, 206
See application file for complete search history.

(56) References Cited

U.S. PATENT DOCUMENTS

| | | | | |
|---|---|---|---|---|
| 9,191,492 | B1* | 11/2015 | Miller | G06Q 30/00 |
| 9,571,991 | B1* | 2/2017 | Brizendine | G06Q 20/3255 |
| 9,720,672 | B2* | 8/2017 | Lipton | G06F 8/61 |
| 10,365,922 | B1* | 7/2019 | Wang | G06F 8/71 |
| 10,375,060 | B1* | 8/2019 | Graves | H04W 12/77 |
| 10,601,740 | B1* | 3/2020 | Harding | H04L 51/04 |
| 10,643,234 | B1* | 5/2020 | Dennis | G06F 3/048 |
| 10,693,872 | B1* | 6/2020 | Larson | G06F 21/31 |
| 11,195,215 | B1* | 12/2021 | Silver | G06Q 20/10 |
| 2005/0044164 | A1* | 2/2005 | O'Farrell | G06F 16/25 |
| | | | | 709/213 |
| 2008/0313282 | A1* | 12/2008 | Warila | G06F 40/151 |
| | | | | 717/172 |
| 2012/0221657 | A1* | 8/2012 | Zeevi | G06F 9/54 |
| | | | | 709/206 |

(Continued)

FOREIGN PATENT DOCUMENTS

| | | |
|---|---|---|
| EP | 1915711 A2 | 4/2008 |
| EP | 2950307 A1 | 12/2015 |

(Continued)

*Primary Examiner* — Thu Ha T Nguyen
(74) *Attorney, Agent, or Firm* — Lando & Anastasi, LLP

(57) ABSTRACT

A chatbot system, a method of operating a chatbot system, a mobile application and a method of operation of a mobile application for providing conversational communications between a user and a primary system via chatbot. The communications utilise a modified message comprising a main component and a supplementary component.

23 Claims, 7 Drawing Sheets

(56) References Cited

U.S. PATENT DOCUMENTS

| | | | | |
|---|---|---|---|---|
| 2012/0265528 A1* | 10/2012 | Gruber | | G10L 15/18 |
| | | | | 704/235 |
| 2013/0332283 A1* | 12/2013 | Faith | | G06Q 30/0239 |
| | | | | 705/14.64 |
| 2013/0346068 A1* | 12/2013 | Solem | | G10L 15/26 |
| | | | | 704/9 |
| 2014/0019958 A1* | 1/2014 | Sherman | | G06F 8/61 |
| | | | | 717/178 |
| 2015/0012838 A1* | 1/2015 | Hegstad | | G06F 11/3688 |
| | | | | 715/745 |
| 2016/0070801 A1* | 3/2016 | Patil | | G06F 16/9535 |
| | | | | 707/727 |
| 2016/0253420 A1* | 9/2016 | Shapira | | G06F 16/951 |
| | | | | 707/706 |
| 2016/0299751 A1* | 10/2016 | Shapira | | G06F 16/972 |
| 2016/0313906 A1* | 10/2016 | Kilchenko | | G06F 3/147 |
| 2018/0032997 A1* | 2/2018 | Gordon | | G06Q 30/0269 |
| 2018/0125689 A1* | 5/2018 | Perez | | A61N 1/36014 |
| 2018/0144126 A1* | 5/2018 | Swinke | | G06F 21/316 |
| 2018/0189794 A1* | 7/2018 | Campos | | H04L 63/0815 |
| 2018/0212904 A1* | 7/2018 | Smullen | | H04L 67/61 |
| 2018/0302349 A1* | 10/2018 | Ban | | H04L 69/08 |
| 2018/0314621 A1* | 11/2018 | DiTullio | | H04L 67/34 |
| 2018/0329993 A1* | 11/2018 | Bedadala | | G06F 40/58 |
| 2018/0337818 A1* | 11/2018 | Ban | | H04L 67/02 |
| 2018/0357309 A1* | 12/2018 | Eidem | | H04L 67/141 |
| 2018/0357310 A1* | 12/2018 | Eidem | | H04L 63/0823 |
| 2018/0358010 A1* | 12/2018 | Eidem | | G10L 15/1815 |
| 2018/0359198 A1* | 12/2018 | Eidem | | G06F 40/253 |
| 2018/0365212 A1* | 12/2018 | Banerjee | | H04L 51/02 |
| 2019/0103095 A1* | 4/2019 | Singaraju | | G06N 5/003 |
| 2019/0108603 A1* | 4/2019 | Waslander | | G06Q 30/0283 |
| 2019/0121801 A1* | 4/2019 | Jethwa | | G06F 16/243 |
| 2019/0158309 A1* | 5/2019 | Park | | H04L 12/2832 |
| 2019/0198011 A1* | 6/2019 | Kerr | | G10L 13/10 |
| 2019/0236132 A1* | 8/2019 | Zhu | | G06N 20/20 |
| 2019/0286711 A1* | 9/2019 | Terry | | G06N 20/00 |
| 2019/0286713 A1* | 9/2019 | Terry | | G06F 40/56 |
| 2019/0318724 A1* | 10/2019 | Chao | | G10L 15/22 |
| 2019/0318729 A1* | 10/2019 | Chao | | G10L 15/14 |
| 2019/0340200 A1* | 11/2019 | Coimbra | | G06F 3/167 |
| 2019/0341039 A1* | 11/2019 | Bharadwaj | | G06F 40/30 |
| 2019/0348030 A1* | 11/2019 | Anders | | G10L 15/22 |
| 2019/0370364 A1* | 12/2019 | Casatelli | | G06Q 40/12 |
| 2019/0371313 A1* | 12/2019 | Naughton | | G10L 15/30 |
| 2020/0050788 A1* | 2/2020 | Feuz | | G10L 15/30 |
| 2020/0097247 A1* | 3/2020 | Molina | | G06F 16/26 |
| 2020/0213251 A1* | 7/2020 | Shah | | G06N 20/00 |
| 2020/0242251 A1* | 7/2020 | Wisgo | | G06F 21/564 |
| 2020/0293687 A1* | 9/2020 | Feuz | | H04L 63/102 |
| 2020/0311729 A1* | 10/2020 | Matthews | | G06Q 20/322 |
| 2020/0341970 A1* | 10/2020 | Rodrigues | | H04L 51/02 |
| 2021/0075747 A1* | 3/2021 | Goslin | | H04L 51/02 |
| 2021/0081819 A1* | 3/2021 | Polleri | | G06N 5/046 |
| 2021/0082400 A1* | 3/2021 | Vishnoi | | G06F 40/35 |
| 2021/0144107 A1* | 5/2021 | Liang | | G06N 5/04 |
| 2021/0304074 A1* | 9/2021 | Zaremoodi | | G06K 9/6228 |
| 2021/0314238 A1* | 10/2021 | Cioffi | | H04L 41/5009 |
| 2021/0319360 A1* | 10/2021 | Vishnoi | | G06N 5/043 |
| 2021/0390951 A1* | 12/2021 | Gadde | | G06F 40/30 |
| 2022/0171946 A1* | 6/2022 | Xu | | G06N 3/08 |
| 2022/0171947 A1* | 6/2022 | Xu | | G06N 3/084 |
| 2022/0197306 A1* | 6/2022 | Cella | | G05D 1/0297 |

FOREIGN PATENT DOCUMENTS

| | | |
|---|---|---|
| EP | 3158691 A1 | 4/2017 |
| EP | 3203691 A1 | 8/2017 |
| WO | 2011088053 A2 | 7/2011 |
| WO | 2014/004536 A2 | 1/2014 |
| WO | 2017136742 A1 | 8/2017 |

* cited by examiner

CHATBOT SYSTEM

CROSS-REFERENCE TO RELATED APPLICATIONS

This Application claims priority from Application No. 1720798.6 filed on Dec. 13, 2017 in the United Kingdom. The entire contents of this application are incorporated herein by reference in their entirety.

BACKGROUND

This invention relates to a chatbot system, a method of operating a chatbot system, a system comprising the chatbot system, a mobile application, and a method of method of operation of a mobile application.

Chatbots are becoming an increasingly popular online method for product and service providers to interact with their customers and users. Chatbots are a form of software agent and may be referred to as chatterbots, Artificial Conversational Entities, conversational agents, smart assistants, conversational User Interfaces (UI) or other such terms. A chatbot is a system that mimics conversation, either by voice or text, with a user so as to provide them with information and services and also receive information from the user. For example, users may ask a weather chatbot for a weather forecast, book tickets for travel or entertainment by accessing the chatbot for the relevant supplier or purchase products from retailers. Chatbots can also function as a user interface for primary software applications, for example, they can be used to record, update and query data in an accounting software application. Chatbots allow users to interact with product and service providers in a simple and intuitive manner.

Users typically access chatbots through a messaging service or chat service, for example, Slack®, Facebook® Messenger®, or Skype®. The operator of a primary service may provide a chatbot that operates through a messaging service, to provide a user interface to their systems. This can be convenient for a user as it allows them to access a wide array of information and services without leaving their messaging service, however, there are a number of drawbacks. For example, the functionality of the messaging service may be limited. The messaging channel may not be able to access user data that is stored on the phone. The messaging channel is limited in the way in can display information to the user, being limited to textual data (plain text, HTML or PDF). Finally, the data transmitted through the messaging app is not guaranteed to be secure, and in some cases, may be accessed or stored by the third-party channel provider.

The above information is presented as background information only to assist with an understanding of the present invention. No determination has been made, and no assertion is made, as to whether any of the above might be applicable as prior art with regard to the present invention.

BRIEF SUMMARY OF THE DISCLOSURE

Embodiments of the invention are set out in the appended claims.

In accordance with the present inventions there is provided an improved chatbot system for accessing at least one remote primary system for storing and processing user data and tasks, the chatbot system comprising a mobile application and a chatbot server, wherein the mobile application is adapted to be installed on a personal mobile communications device so as to have access to the native functionality and associated data thereof, and the chatbot server is adapted to provide an interface for the at least one primary system, wherein the chatbot communicates with the mobile application using a modified message type, where a modified message of the modified message type comprises a main component and a supplementary component, each component comprising at least one data element.

In accordance with the present inventions there is provided a chatbot system comprising a mobile application and a chatbot wherein the mobile application is adapted to be installed on a mobile device so as to have access to the native functionality and associated data thereof, and the chatbot is suitable for communication with at least one primary system adapted to store and process user data and tasks, wherein the chatbot communicates with the mobile application using a modified message type, a modified message of the modified message type comprising a main component and a supplementary component, each component comprising at least one data element.

The supplementary component of a modified message received by the application may comprise an instruction to the application to be implemented using native functionality of the mobile device.

Optionally, the supplementary component comprises an instruction in relation to generating a notification. The notification may be generated at a certain time, and/or at a certain location.

The supplementary component of a modified message sent by the application may comprise data associated with a native function of the mobile device.

The supplementary component may comprise a metadata data element relating to a data element of the main component.

Optionally, the supplementary component comprises non-text data. The supplementary component may comprise a JSON data element. The supplementary component may comprise calendar data from the mobile device. The supplementary component may comprise location data from the mobile device. Optionally, the supplementary component comprises one or more of calendar data, contact data; location data; clock and alarm data; compass data; sensor data; biometric data, image data, device usage data, and device configuration data.

The chatbot system may be adapted to provide an interface for one or more primary systems.

Optionally, the application is a native application.

The mobile application is a light app such that the processing for the chatbot system is carried out by the chatbot.

Optionally, the primary system is remote to the mobile device.

The chatbot system may be adapted to communicate via Microsoft Directline API.

The chatbot system may be a federated chatbot system comprising a parent chatbot and at least one sub-chatbot. Optionally, the chatbot system comprises two or more chatbots.

In accordance with the present inventions there is provided an improved method of operating a chatbot system for accessing at least one remote primary system for storing and processing user data and tasks, the chatbot system comprising a chatbot server and at least one mobile application installed on a personal mobile communications device so as to have access to the native functionality and associated data thereof, wherein the chatbot server is adapted to act as an interface between one or more primary systems and the at least one mobile application, the method comprising the chatbot server receiving a message from the mobile application; the chatbot server identifying a tag on the message indicating that the message is a modified message, wherein a modified message comprises a main component and a supplementary component, each component comprising at least one data element.

In accordance with the present inventions there is provided a method of operating a chatbot system, the chatbot system comprising a chatbot server and at least one mobile application installed on a mobile device so as to have access to the native functionality and associated data thereof, wherein the chatbot server is adapted to act as an interface between one or more primary systems and the at least one mobile app, the method comprising the chatbot server receiving a message from the mobile application; the chatbot server identifying a tag on the message indicating that the message is a modified message, wherein a modified message comprises a main component and a supplementary component, each component comprising at least one data element.

Optionally, the received message comprises an instruction to the application to be implemented using native functionality of the mobile device.

The method may further comprise the mobile application implementing the instruction from the modified message.

The method may further comprise the mobile application transmitting a modified message to chatbot server wherein the supplementary component comprises data associated with a native function of the mobile device.

In accordance with the present inventions there is provided a system comprising the chatbot system and a primary system adapted to store and process data and tasks of a user of the chatbot system, the chatbot system being adapted to act as an interface between the primary system and the mobile application.

In accordance with the present inventions there is provided a primary system for use in the system, the primary system adapted to receive data and task requests from the chatbot system, and transmit primary system output to the chatbot system.

In accordance with the present inventions there is provided a mobile application to provide a user with a conversational interface to a chatbot server for accessing at least one remote primary system for storing and processing user data and tasks, the mobile application being adapted to be installed on a personal mobile communications device so as to have access to the native functionality and associated data thereof and to communicate with the chatbot server using messages of a modified message type, wherein a modified message comprises a main component and a supplementary component, the mobile application being further adapted to identify modified messages on receipt and generate modified messages for transmission.

In accordance with the present inventions there is provided a mobile application to provide a user with a conversational interface to a chatbot, the mobile application being adapted to be installed on a mobile device so as to have access to the native functionality and associated data thereof and to communicate using messages of a modified message type, wherein a modified message comprises a main component and a supplementary component, the mobile application being further adapted to identify modified messages on receipt and generate modified messages for transmission.

The supplementary component of a received modified message may comprise an instruction to the application to be implemented using native functionality of the mobile device.

The mobile application is adapted to generate a modified message where the supplementary component comprises data associated with a native function of the mobile device. Optionally, the supplementary component comprises one or more of calendar data, contact data; location data; clock and alarm data; compass data; sensor data; biometric data, image data, device usage data, device configuration data.

In accordance with the present inventions there is provided a method of operation of a mobile application on a mobile device, the mobile application adapted to communicate with a chatbot server, the method comprising creating a message of a modified message type, a modified message comprising a main component and a supplementary component, wherein creating the message comprises adding an identifying tag to specify that it is a modified message, populating the supplementary component of the message data associated with a native function of the mobile device; transmitting the modified message to the chatbot; receiving a message from the chatbot; checking for a modified message identifying tag on the received message, and if present, processing the supplementary component of the received message.

The supplementary component of the received message may comprise an instruction to the application to be implemented using native functionality of the mobile device, and the method comprising the mobile application implemented the instruction.

BRIEF DESCRIPTION OF THE DRAWINGS

Embodiments of the invention are further described hereinafter with reference to the accompanying drawings, in which:

FIG. 2(*b*) is a block diagram of a structure of a modified message according to the disclosure;

DETAILED DESCRIPTION

Figure 1:
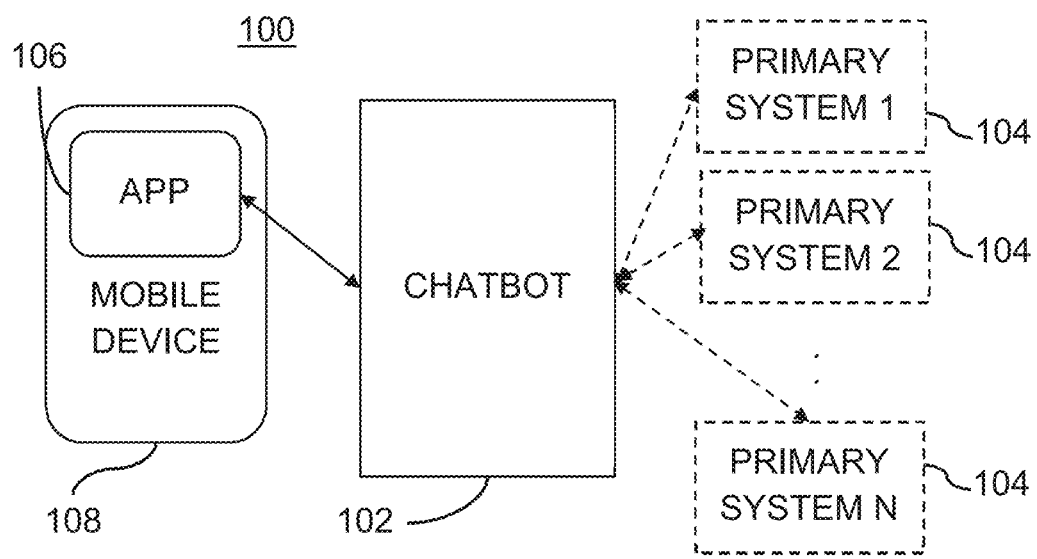
FIG. 1 is a block diagram of a chatbot system according to the disclosure.

The following description of exemplary embodiments of the present invention, with reference to the accompanying drawings, is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the embodiments described herein can be made without departing from the scope of the invention.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present invention.

Referring initially to FIG. 1, there is shown a block diagram of a chatbot system 100 according to the disclosure. The chatbot system, indicated generally by the reference numeral 100 comprises a chatbot server 102 in communication with an application 106 installed on a personal mobile communications device 108, which may also be referred to as a mobile device. The chatbot system 100 may be in communication with one or more primary systems 104 through the chatbot server 102, such that the chatbot system provides an interface for the user to access the primary systems As an application 106, or app, installed on the mobile device, the application 106 has access to the native functionality of the mobile device and associated data thereof. For example, the application may have access to calendar data, contact data, location functionality, notification functionality and so on. The application 106 may also be referred to as a client. The application 106 is at least partly a native application. A native application may be understood to refer to an application that has been specifically developed for use on a particular platform or device. Such native apps can interact with and take advantage of operating system features and other software that is typically installed on that platform, such as the calendar, location services, push notifications and the like. The app 106 may be a hybrid application comprising native aspects and HTML aspects, for example a hybrid app of HTML5 and native components.

The chatbot server 102 provides a typical chatbot comprising one or more dialogs (not shown) which are programmatic representations of conversational flow. The dialog may comprise a plurality of user inputs and a plurality of chatbot outputs. Links exist between the user inputs and the chatbot outputs. Each chatbot output is linked to at least one user input, but may be linked to more than one. A dialog may comprise as few as one user input and chatbot output combination. A dialog may relate to a conversational element at one stage of a user interaction with a chatbot server 102. In some situations, dialogs may be linked together such that completing one dialog immediately starts a second dialog. Such an arrangement may be referred to as chained dialogs or waterfall dialogs. The conversational flow, also referred to as a workflow, may comprise long workflows, including six or more request/response sets.

The chatbot server 102 is adapted to provide a user with a conversational interface to the data and functionality of one or more primary systems. The chatbot server 102 provides a messaging framework which may use the Microsoft Direct Line API, the Amazon Web Services Lex API, or the like. The application provides a conversational interface. The conversational interface may be provided using for example the ChatKit library (https://qithub.com/stfalcon-studio/ChatKit), or ChatMessageView (https://android-arsenal.com/details/1/5032).

Traditionally, native mobile applications, have access to information on the user's device, such as calendar, contacts, location data etc. and mobile applications are in general able to also able to deliver a rich user interaction experience via mobile visual components. However, use of native mobile apps may be undesirable for several reasons. Firstly, app usage is considered by some to be on the decline due to users reaching the memory capacity of their mobile devices, and being generally disinclined to install large numbers of apps. Further, mobile apps can require frequent updates which can be irritating for and disruptive to the user. Additionally, app development and maintenance requires specialist skill. Mobile apps typically do not support reusability across multiple applications, hence multiple code bases must be developed and maintained to support multiple primary software applications.

The primary systems 104 may comprise any type of system providing a service to a user, for example, an accounts system, a travel booking system, an expenses system, an entertainment system and the like. Interactions with primary systems 104 via the chatbot system 100 may related to processing user data and tasks, for example, a request for information, a request to record information, and so on. Interaction with the primary systems 104 may be initiated by the user, or independently of the user, by e.g. the chatbot system itself. For example, the chatbot system may take action on detection of the mobile device connecting to a Wi-Fi network. A primary system 104 may be located on the mobile device. A primary system may have either local, remote or cloud based data storage. A primary system 104 may be located entirely in a cloud-based format. In a further example, the primary system may be a remote legacy application, with data made accessible to the chatbot system via a cloud system. In such a system, the chatbot may communicate with a remote legacy primary system via an adaptor component in operation at the remote site of the legacy system. Primary systems may typically be operated by third party organisations, and their function may be separate from the functions of the providers of the personal mobile communications device and the network it operates on.

The primary systems 104 may be remote from the personal mobile communications device 108. The primary systems 104 may be remote from the chatbot server 102.

The combination of the chatbot server 102 and application 106 allows the chatbot system 100 to deliver smart/personal assistant functionality to the chatbot user in relation to the primary systems associated therewith. Primary systems who previously allowed users to interact with them via a chatbot operated through a messaging channel can, by way of the application 106 the chatbot system 100, provide an improved way for their users to interface with them through their mobile devices.

Figures 2A, 2B:
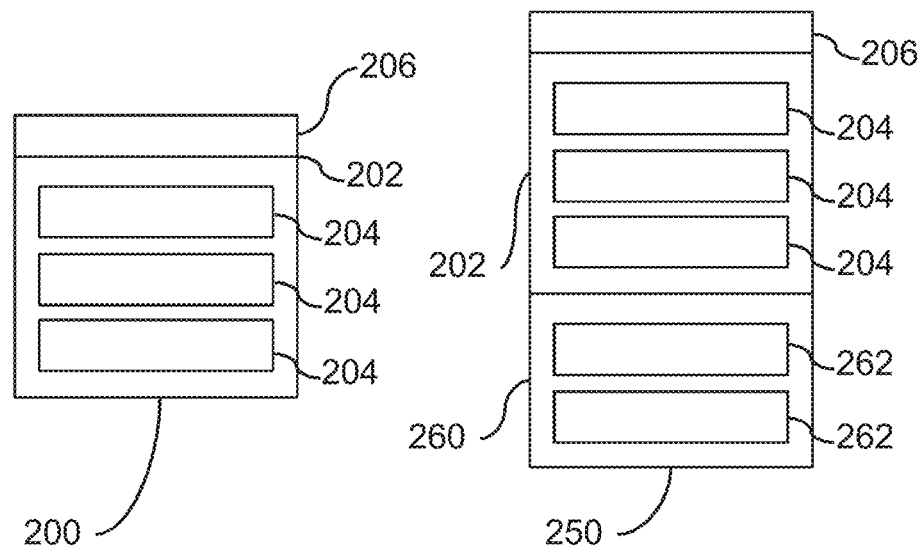
FIG. 2(*a*) is a block diagram of the structure of a standard chatbot message.

Referring to FIG. 2(a), there is shown a block diagram of the structure of a message type for use in a chatbot. The message, indicated generally by the reference numeral 200, comprises a main message body 202, itself comprising three message data elements 204. The message 200 further comprises a message header 206. It will be understood that the message 200 may comprise a lesser or greater number of data elements. The data elements 204 are limited to text data. Non-text data such as PDFs, image or video files may be sent as attachments in the message. The message may be in the form of a payload of a JavaScript Object Notation (JSON) data object. The data elements of the message would therefore be in the form supported by the JSON format i.e. name/value pairs, where the value can be a string, number, array, Boolean, or another JSON object.

Referring now to FIG. 2(b), there is shown a block diagram of a structure of the modified message type for use with the chatbot system 100 of the disclosure. The modified message 250 comprises the main message body 202 of the message 250 having main message data elements 204, and a message header 206. The modified message 250 further comprises a supplementary component 260. The supplementary component 260 comprises two data elements 262, which may be referred to as supplementary data elements 262. It will be understood that the message 250 may comprise a lesser or greater number of data elements. The supplementary data elements 262 are not restricted in the type of content they can contain. The modified message further comprises a tag (not shown) indicating that it is a modified message, and as such may contain a supplementary component 260. The tag may be located in a root property of the message. The tag may be located in the message header 206. The tag may indicate that the message originated in or is intended for the application 106 installed on the mobile device 108. A supplementary component 260 may typically comprise an instruction to the application 106 to be implemented using native functionality of the mobile device 108, or data associated with a native function of the mobile device 108.

In one example, the tag is a text property included in the message (e.g. "channel":"sage-peggapp-android"). The chatbot server 102 is adapted to read this property of the message, and compare its value to its list of known client application IDs. If it matches, then the chatbot knows that the message will contain additional data custom to that matching application.

The supplementary data elements 262 may contain metadata relating to the data elements of the main message body. The supplementary data elements 262 may contain additional data elements.

The supplementary component 260 may be a JSON data object. The supplementary component 260 may be a single value, such as a string, number, or Boolean. Where the message itself is the payload of a JSON data object, the supplementary component may be a further JSON data object.

The improved chatbot system 102 facilitates greater user interaction with the primary systems and less limited communication having more diverse data types.

Figure 3A:
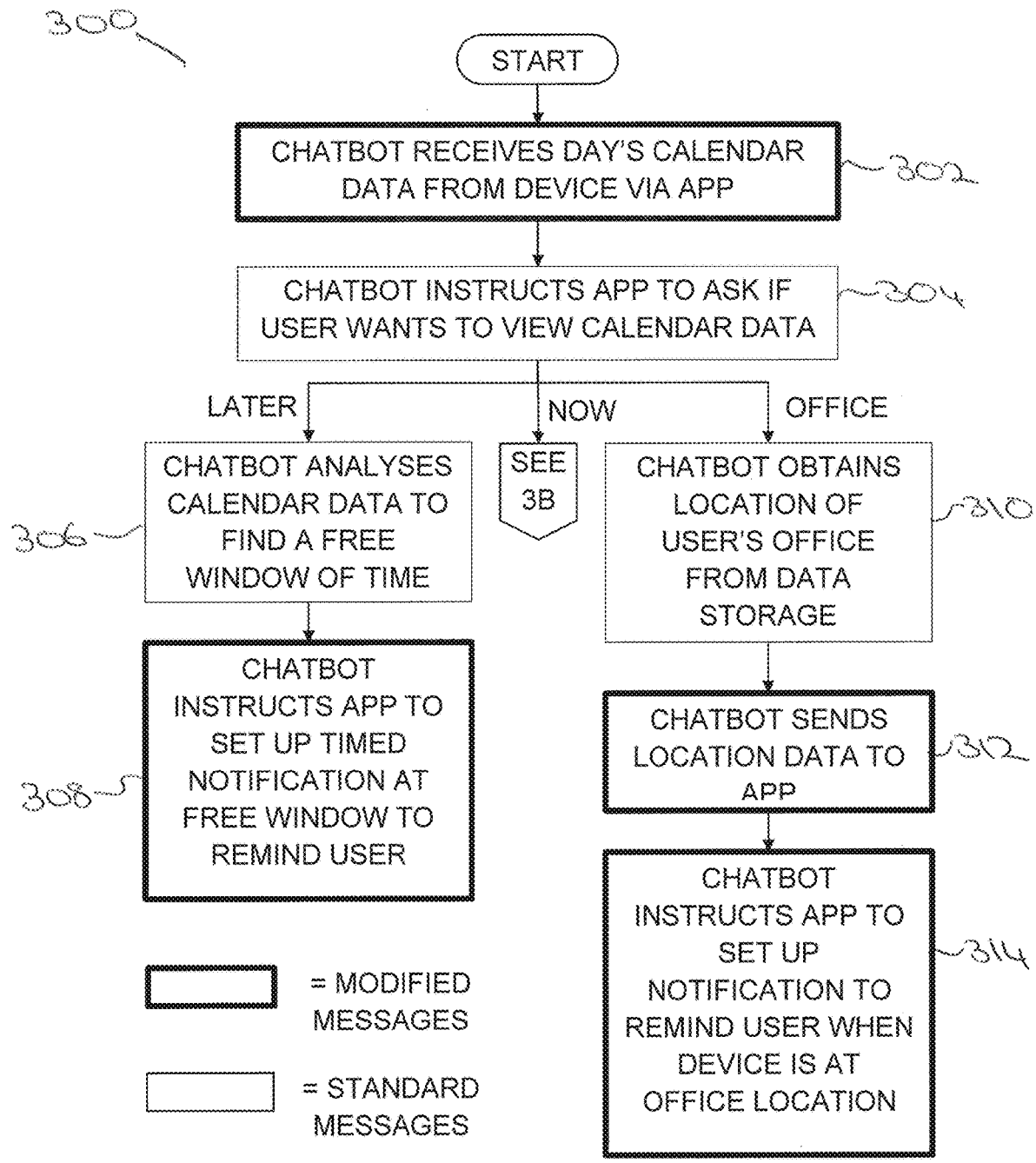
FIG. 3A is a first part of a flow chart indicating an example method according to the disclosure.
Figure 3B:
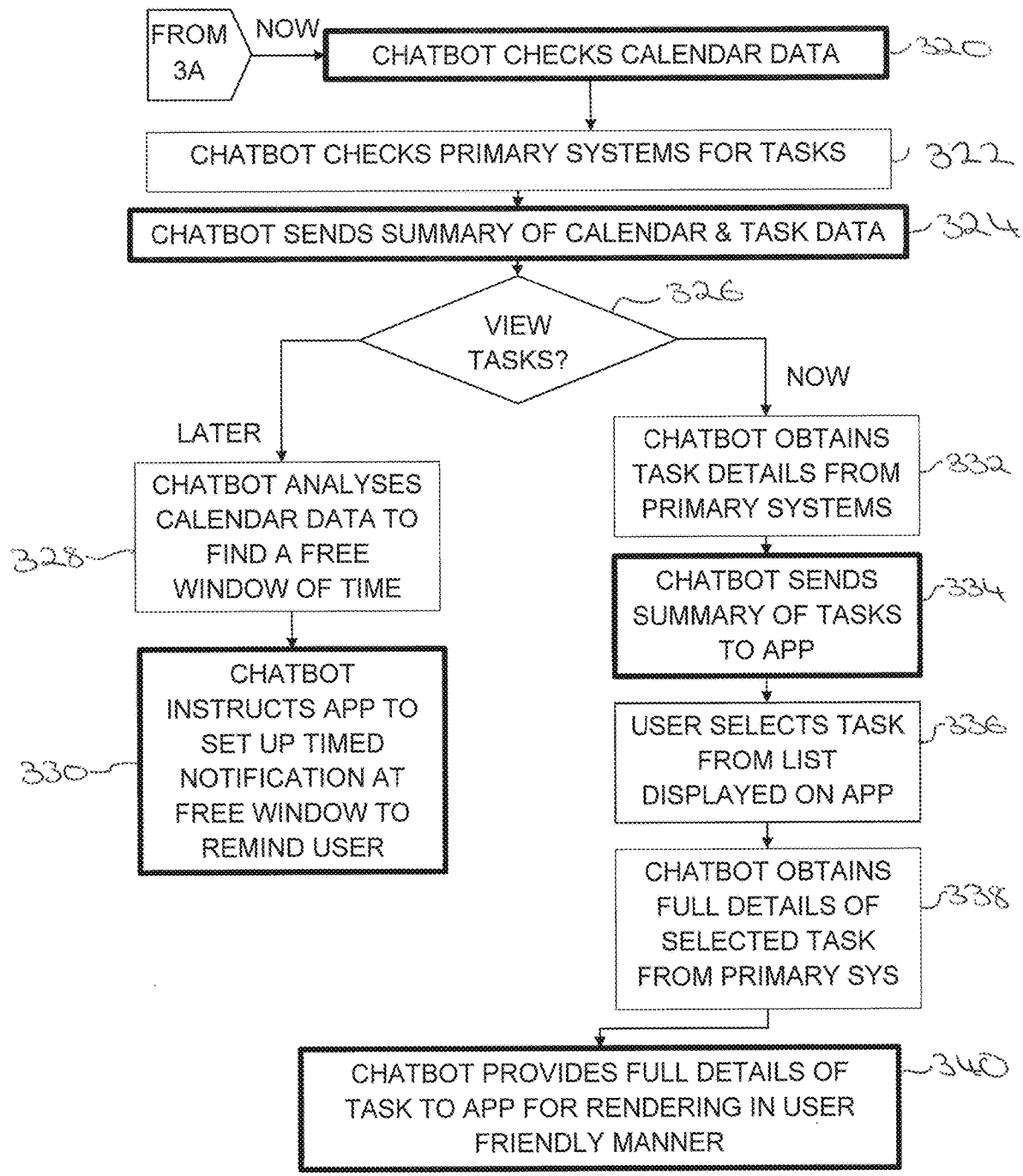
FIG. 3B is a second part of the flow chart of FIG. 3A.

FIG. 3 shows a flowchart 300 relating to an example of the chatbot system 100 of the disclosure and for reasons of space is divided into FIG. 3A and FIG. 3B. FIG. 3A shows the start of the example method and two potential paths, while FIG. 3B shows a third potential path. In FIG. 3, steps illustrated in boxes having a thicker outline indicate steps that comprise the use of a modified message 250 according to the disclosure. The method of the flowchart 300 relates to activities that a user would typically want to do at the start of their day—such as checking their calendar, and finding out what tasks, for example outstanding invoices, need to be dealt with that day. The method begins when the application detects that the user is interacting with her device at the start of the day. It will be understood that the disclosure is not limited to a start-of-the-day implementation and other initiating factors may be implemented.

In step 302, the mobile app 106 starts the conversation with the chatbot server 102. The application 106 transmits a modified message 250 to the chatbot server 102, including a JSON supplementary component 260. In this example, the supplementary component 260 comprises calendar data from the calendar of the mobile device. When the mobile app 106 starts the conversation with the chatbot server 102, it passes additional information required by the chatbot server 102 using the "channelData" element of the conversation's activity. The term "channelData" is defined in the schema for Microsoft Direct Line as an object that contains channel-specific content. Some channel providers choose for their channels to provide features that require additional information that cannot be represented using the attachment schema. For those cases, the "channel Data" property can be set by the channel providers to relate to the channel-specific content as defined in the channel's documentation.

The following is an example of the JSON that is sent when starting the "calendar" conversation:

```
{
    "channel": "sagedirectline-peggapp-android",
    "channelData": {
        "calendarEntries": [
            {
                "allDay": false,
                "endDate": "Dec 31, 1969 4:00:00 PM",
                "id": "1617",
                "location": "Webex",
                "startDate": "Jul 3, 2017 5:00:00 AM",
                "startTime": "5:00 AM",
                "title": "Team Daily Standup"
            }
        ],
        "dialogId": "app-poc-bot-calendar:start"
    },
    "from": {
        "id": "da9f8842-43aa-41a7-be55-5ff101284deb",
        "name": "Jackie"
    },
    "text": "Calendar",
    "type": "Message"
}
```

On receipt of the modified message 250 from the application 106 on the mobile device 108, the chatbot server 102 identifies that a modified message 250 has been received and analyses the message 250 to identify the supplementary component 260 and its contents. The chatbot server 102 reads the contents of the supplementary component 260. The chatbot server 102 may store the contents of the supplementary component 260 with the user's session so that it can be used for the conversations that may follow. The chatbot server 102 may trigger an action in response to the supplementary component 260. The action triggered by the chatbot may be carried out by the mobile app 106, or by a primary system 104. For example, calendar data received may be stored to allow the chatbot to identify the user's free time. However, if for example, the information received indicated that the user was driving, it would not be necessary to store this information, the chatbot may simply cause an action to be triggered on the application.

The additional information supplied by the mobile application 106 to the chatbot server 102 may comprise any data accessible by the mobile application 106, including but not limited to calendar data; contact data; location data; clock and alarm data; compass data; data; gyroscope or velocity data; Near Field Communications (NFC) data; sensor data such as infrared data, temperature data and the like; biometric data including graphical user interface interactions; voice interaction; photo; videos; phone data including usage; cloud services such as iCloud and the like; device information including the make, model, software version and so on, files, data from health apps and sensors, home data such as that from Internet of Things (IoT) devices, smart devices and the like, message data; data Bluetooth connected devices; network info; or combinations thereof. Typically, such data may be regarded as data associated with a native function of the mobile device 108.

In step 304, the chatbot server 102 sends a chat message to the application 106 for display to the user. The message asks if the user would like to review what she should do that day. The chat message includes three options for user response. The user's chosen option is sent in a chat message back to the chatbot server 102 by the application. The options are "Now", "Later" and "Office". The chatbot server 102 sends a further chat message to the application confirm that user's selection. The path for option "Now" is illustrated in FIG. 3B and will be described in relation thereto.

If the "Later" option is chosen by the user, the chatbot server 102 reviews the stored calendar data for the user in step 306 and identifies at least one window of free time in the user's day. When a suitable period of free time has been identified, in step 308 the chatbot server 102 sends a modified message 250 to the application with a supplementary component 260 comprising instructions to set up a notification at the time of the window, asking the user again if she would like to review what she should do that day. The command localNotification/timed is used to achieve this. This instructs the client to show a notification for the user to view their appointments and tasks after a specified period. The application parses the content portion of the channelData to read the timespan to setup a notification on the user's mobile device that will trigger after that timespan has elapsed. The user can then click that notification to open the application and start the calendar conversation with the chatbot server 102.

The following is an example of the JSON of a chatbot message received by the application that implements a timed notification.

```
{
    "type": "message",
    "id": "7Msta5lbkFf7gWiEJ5GTo310000004",
    "timestamp": "2017-08-25T23:31:07.5532915Z",
    "localTimestamp": "2017-08-25T23:31:06.106+00:00",
    "channelId": "directline",
    "from": {
        "id": "sbd",
        "name": "Pegg POC"
    },
    "conversation": {
        "id": "7Msta5lbkFf7gWiEJ5GTo3"
    },
    "text": "No problem. I'll check back with you again in a few hours.",
    "inputHint": "acceptingInput",
    "channelData": {
        "metadataType": "localNotification/timed",
        "content": "{\"dialogId\":\"app-poc-bot-calendar:later\",\"timespan\":\"P0Y0M0DT2H0M0S\"}"
    },
    "replyToId": "7Msta5lbkFfgWiEJ5GTo3|0000003"
}
```

If the "Office" option is chosen by the user, in step 310 the chatbot server 102 obtains or reads the geographic coordinates of the location of the user's office. In step 312, the chatbot server 102 then sends a modified message 250 to the application 106 wherein the supplementary component 260 comprises the location of the user's office and instructions to the application to generate a notification when it detects that the mobile device is at that location. The command localNotification/location is used to achieve this. The application parses the content portion of the channelData to read the coordinates of a location and use that to setup a geofence on the user's mobile device 108. When the user arrives at that location, a notification will appear and the user can click the notification to open the application 106 and start the calendar conversation.

The user's office location may be stored in a primary system 104, in the chatbot server 102, or by the app 106 itself. It may be obtained by checking an address of the user's employer. The information could be obtained from, or verified by, the user at an initial set-up stage of the app 106 of the chatbot system 100. This may involve the app 106 asking the user if they are currently in their office and then checking the location via the devices location services. The user may then be asked to confirm that the identified location is correct.

The following is an example of the JSON of a chatbot server 102 message received by the application app that includes this metadata:

```
{
    "type": "message",
    "id": "HgB2upFfwVkEkybjhvuQ8R|0000004",
    "timestamp": "2017-08-25T22:19:04.6474276Z",
    "localTimestamp": "2017-08-25T22:19:04.757+00:00",
    "channelId": "directline",
    "from": {
        "id": "sbd",
        "name": "Pegg POC"
    },
    "conversation": {
        "id": "HgB2upFfwVkEkybjhvuQ8R"
    },
    "text": "No problem. I'll check back with you again when you are at your office.",
    "inputHint": "acceptinginput",
    "channelData": {
        "metadataType": "localNotification/location",
        "content": "{\"dialogId\":\"app-poc-bot-calendar:later\",\"geocoordinates\":\"49.2598514,-123.1030626\"}"
    },
    "replyToId": "HgB2upFfwVkEkybjhvuQ8R|0000003"
}
```

It will be understood that for the "Office" option to be useful, the location services on the User's device 108 must be activated. The person skilled in the art will understand that the application may prompt and direct the user to turn on location services on selection of the "Office" option, if not already turned on. The mobile device may make use of geofencing functionality provided by Google Play services.

Referring now to FIG. 3B, there is shown a flowchart indicating the steps that occur if the "Now" option is chosen by the user in step 304. In step 320, the chatbot server 102 checks the previously stored calendar data, and in step 322, the chatbot server 102 checks the primary systems 104 for tasks for the user to do that day. The chatbot server 102 may retrieve a simple count of the number of tasks outstanding for each primary system 104 at this stage. The type of tasks the user may have will depend on the primary systems 104 with which she in engaging. For example, a deadline management primary system may provide details on upcoming deadlines; an accounts primary system may provide details on invoices for which reminders need to be emailed, or that require payment to be made; an email primary system may provide details of correspondence requiring a response; a service industry primary system might notify the service-person of the clients to be visited; an expenses primary system might notify a manager of the expense reports they need to review/approve, and an employee of expenses to be submitted submit, a payroll/performance primary system might notify an employee of a performance review they need to review/submit. For convenience, we will use the example of invoices for which reminders need to be sent in further discussion of this flowchart.

In step 324, the chatbot server 102 sends a modified message 250 to the application 106 wherein the supplementary component 260 comprises a summary of the calendar data, for example, the time, location, and subjects of the day's meetings; and a summary of the task data, indicating the number and type of tasks, for example the number of invoices where payment is overdue. The modified message 250, which is displayed in step 326 also includes a question to the user as to whether she would like to view the tasks, with options for response of "Now" and "Later". If the option for "Later" is chosen, similar steps are taken to those for the "Later" option in FIG. 3A. In step 328, the chatbot server 102 reviews the stored calendar data for the user and identifies at least one window of suitable free time in the user's day. When a suitable period of free time has been identified, typically the earliest such period, in step 330 the chatbot server 102 sends a modified message 250 to the application with a supplementary component 260 comprising instructions to set up a notification at the time of the window, asking the user again if she would like to review her tasks for that day. The command localNotification/timed is used to achieve this. This instructs the client to show a notification for the user to view their tasks and appointments after a specified period. The application 106 parses the content portion of the channelData to read the timespan to setup a notification on the user's mobile device 108 that will trigger after that timespan has elapsed. The user can then click that notification to open the application 106 and start the calendar conversation with the chatbot server 102.

If the user chooses the "Now" option at step 326, the chatbot server 102 obtains summary details of the outstanding tasks from the primary systems 104. For example, in the case of an invoice the summary details may comprise the date of the invoice, the amount and the contact person. For an email requiring a response, the summary details may include the date, the sender and the subject.

In step 332, the chatbot server 102 sends a modified message 250 to the application 106, wherein the supplementary component 260 comprises the summary details of the tasks. These summary details may be presented in a list format, carousel format or the like to the user, for review and selection. In one example, the summary details are presented to the user by way of a HeroCard as defined in the MS DirectLine API. A HeroCard is a type of rich card. A rich card comprises a title, description, link, and images. A modified message can contain multiple rich cards, displayed in either list format or carousel format. A HeroCard is a card that typically contains a single large image, one or more buttons, and text. By using a HeroCard, the summary details for a task can be provided with a button to allow a user select their task of interest. In step 336, the user selects a task and the application 106 sends a message to the chatbot server 102 with the selection. The chatbot server 102 then in step 338 obtains the full details of the selected task from the relevant primary systems 104. Next in step 340, the chatbot server 102 sends a modified message 250 to the application 106 wherein the supplementary component 260 comprises the full details of the task. The task may then be displayed by the application 106. The task may be rendered in a user-friendly manner, e.g. with interactive links useful for carrying out aspects of the task. For example, the task may comprise an invoice for which payment needs to be actioned, in which case the invoice may be displayed on full screen with interactive links. An interactive link may for example enable a summary value on the invoice to be clicked on, and a full breakdown of items making up the summary value being displayed. Interactive links may provide supplier contact details such as phone number or email address and enable a phone call to be initiated, or an email to the supplier to be drafted or automatically sent. Interactive links might enable direct payment of the invoice via one or more payment providers.

In further examples, data may be displayed to the user using interactive visual elements, for example graphs and charts, with may further include animation.

In the example where the task is an invoice to be chased, the command used to provide the full details to the application is invoice/detail. Using this command includes the JSON for an invoice in the content of the channelData and the URL for its PDF in the attachments of the message. The application 106 uses this information to display the invoice details in a user-friendly UI which allows the user to view the invoice, call the contact for the invoice, email the contact the invoice, and download the invoice in PDF format.

The following is an example of the JSON of a chatbot message received by the mobile app 106:

```
{
  "type": "message",
  "id": "HgB2upFfwVkEkybjhvuQ8R|0000012",
  "timestamp": "2017-08-25T22:30:45.5167338Z",
  "localTimestamp": "2017-08-25T22:30:44.899+00:00",
  "channelId": "directline",
  "from": {
    "id": "sbd",
    "name": "Pegg POC"
  },
  "conversation": {
    "id": "HgB2upFfwVkEkybjhvuQ8R"
  },
  "text": "OK. I'm displaying that invoice for you. You can download a PDF, phone the customer, or email them.",
  "inputHint": "ignoringInput",
  "attachments": [
    {
      "contentType": "application/pdf",
      "contentUrl": "https://9a5ef57e.ngrok.io/bots/app-poc-bot/public/Invoice102.pdf"
    }
  ],
  "channelData": {
    "metadataType": "invoice/detail",
    "content": "{\"dialogId\":\"app-poc-bot-invoice:detail\",
\"emailMessage\":\"Hi Jon Doe, \n\nI know you are super busy but the attached invoice needs to be paid. Would you be able to get someone to pay it?.\n\nThank you for your help on this.\",
```

-continued

```
\"invoice\":{\"amountOutstanding\":1705, \"contact\":{\"CONTACTS_COMP
ANY_DEFAULT\":\"-\", \"company\":\"ABC
Company\", \"contactType\":{\"id\":\"Customer\", \"sync\":\"SYNC_SUCCE
SS\"}, \"deliveryAddress\":{\"country\":{\"code\":\"GB\", \"id\":\"GB\
", \"name\":\"United
Kingdom\", \"sync\":\"SYNC_SUCCESS\"}, \"county\":\"London\", \"id\":\"
3fb1-4293-af40-cc4a29be0b6c\", \"postCode\":\"SE1
7SP\", \"streetOne\":\"10 Main St
\", \"streetTwo\":\"\", \"sync\":\"SYNC_SUCCESS\", \"town\":\"Lambeth\"
, \"type\":{\"id\":\"Main\", \"sync\":\"SYNC_SUCCESS\"}}, \"emailAddres
s\":\"jon_doe@somewhere.com\", \"id\":\"19a8-4957-9882-
f704f05dcca9\", \"mainAddress\":{\"country\":{\"code\":\"GB\", \"id\":
\"GB\", \"name\":\"United
Kingdom\", \"sync\":\"SYNC_SUCCESS\"}, \"country\":\"London\", \"id\":\"
3fb1-4293-af40-cc4a29be0b6c\", \"postCode\":\"SE1
7SP\", \"streetOne\":\"10 Main St
\", \"streetTwo\":\"\", \"sync\":\"SYNC_SUCCESS\", \"town\":\"Lambeth\"
, \"type\":{\"id\":\"Main\", \"sync\":\"SYNC_SUCCESS\"}}, \"name\":\"Jo
n Doe\", \"phoneNumber\":\"555-
5555\", \"phoneNumber2\":\"\", \"sourceId\":\"\", \"sync\":\"SYNC_SUCCE
SS\"}, \"currencyCode\":\"GBP\", \"date\":\"2017-03-
03\", \"displayAs\":\"Invoice #102\", \"dueDate\":\"2017-04-
02\", \"id\":\"fakefake-9f6e-40cb-91ab-
ccde2360c5e7\", \"invoiceLines\":[{\"category\":{\"id\":\"d4c9-4ad3-
b7e9-
a1b6b0b94a65\",\"label\":\"Sales\", \"nominalCode\":0, \"sync\":\"SYNC
_SUCCESS\", \"taxCodeId\":\"\", \"type\":{\"id\":\"Sales\", \"sync\":\"
SYNC_SUCCESS\"}}, \"displayAs\":\"Labor\", \"id\":\"fakefake-f6d2-
4042-afe9-
6287335788c6\", \"netAmount\":800, \"parentId\":\"\", \"quantity\":8,\"
sync\":\"SYNC_SUCCESS\", \"taxAmount\":80, \"taxRate\":[\"current\":tr
ue, \"deletable\":false, \"editable\":false, \"id\":\"fakefake-ab5a-
4070-9a26-bb7239bc5eb5\", \"name\":\"Sales
Tax\", \"percentage\":\"0.10\", \"sync\":\"SYNC_SUCCESS\"}, \"totalAmou
nt\":880, \"unitPrice\":100}, {\"category\":{\"id\":\"71a0-4421-a0e2-
9ac50f5e05dc\", \"label\":\"Other
Income\", \"nominalCode\":0, \"sync\":\"SYNC_SUCCESS\", \"taxCodeId\":\
"\", \type\":{\"id\":\"Other\", \"sync\":\"SYNC_SUCCESS\"}}, \"display
As\":\"Parts\", \"id\":\"fakefake-85a1-4f0e-85cc-
4060acf61869\", \"netAmount\":750, \"parentId\":\"\", \"quantity\":3, \"
sync\":\"SYNC_SUCCESS\", \"taxAmount\":75, \"taxRate\":{\"current\":tr
ue, \"deletable\":false, \"editable\":false, \"id\":\"fakefake-ab5a-
4070-9a26-bb7239bc5eb5\", \"name\":\"Sales
Tax\", \"percentage\":\"0.10\", \"sync\":\"SYNC_SUCCESS\"}, \"totalAmou
nt\":825, \"unitPrice\":250}], \"invoiceNumber\":\"102\", \"netAmount\"
:1550, \"notes\":\"Make all checks payable to ABC Company,
Inc\", \"reference\":\"SO
5678\", \"sync\":\"SYNC_SUCCESS\", \"taxAmount\":155, \"termsAndConditi
ons\":\"Total payment due in 30 days\", \"totalAmomnt\":1705}}"
    },
    "replyToId": "HgB2upFfwVkEkybjhvuQ8R|0000011"
}
```

Figure 4:
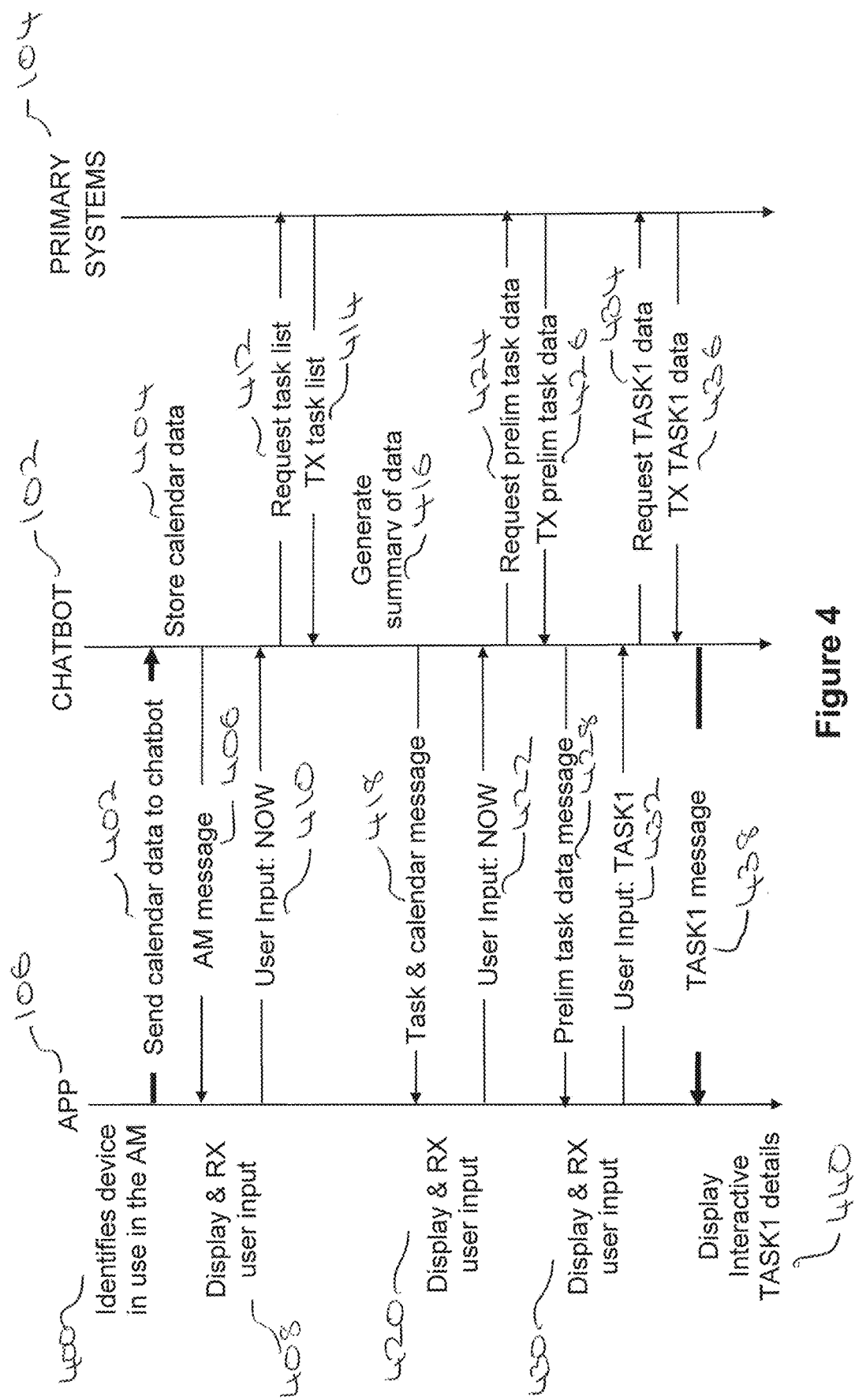
FIG. 4 is a timeline flow diagram of a system according to the disclosure.

Referring now to FIG. 4, there is shown a further representation of the data flow of the chatbot system 100 in use. In step 400, the application 106 identifies that the user has begun interacting with the device 108 at the start of the day. The application 106 accesses the calendar on the mobile device 108 and retrieves the calendar data for that day. Other data that may be retrieved from the device 108 at this stage include location data, for example including nearby places such as hotels and restaurants, and activity data such as if the user is walking, running, or driving. In general, any data that is stored on the device 108 and to which the app 106 is permitted access by the user may be sent by the app 106 to the chatbot server 102. This step may be programmed to happen at a set time every morning; in response to user activity, as detected by an accelerometer in the device; in response to the user interacting with the mobile device; or based on some other trigger. In response to the chosen trigger, the user is presented with a notification asking if they would like to open the app 106 to view tasks for that day. In step 402, the application sends a modified message 250 to the chatbot server 102 with the calendar data, and other data retrieved from the mobile device 108 if applicable. In step 404, the chatbot server 102 stores the calendar data in the user's session. Next, in step 406, the chatbot server 102 generates a "good morning" message for the user and transmits it to the application for display to the user. A sample text for the "good morning" message is "Good morning! As you are up and about, would you like to see what you have going on today? (1. Now, 2. Later, or 3. Office)".

FIG. 4 details the next steps if the user selects "Now". In step 408, the user's selection, in this case "1" for now is sent to the chatbot server 102. In step 410, the chatbot server 102 requests lists of tasks for the user for that day from the primary systems 104. In step 414, the task lists are received from the primary systems 104. In step 416, the chatbot server 102 generates a summary message containing a summary of the task lists and a summary of the calendar data. In step 418, the chatbot server 102 sends a message containing the summary to the application. In step 420, the application displays the message and asks the user when they'd like to engage with the tasks. A sample message may read "You have a busy day today. At 9.00 AM you have the meeting "Marketing" then at 10.00 AM you have the meeting "Sales Proposal". You also have 2 outstanding invoices for which you need to chase up payment. When would you like to do this? (1. Now, or 2. Later)". In step 422, the application sends a message to the chatbot server 102 with the user's selection. In step 424, the chatbot server 102 requests preliminary details of the tasks, for example overdue invoices to be chased for payment or payments to be made, from the primary systems 104. In step 426, the chatbot server 102 receives the preliminary task data from the primary systems 104. In step 428, the preliminary task data is sent to the application 106. In step 430, the application 106 displays the preliminary data to the user and allows a user to select one task for review. In step 432, the application 106 transmits the user's selection to the chatbot server 102. In step 434, the chatbot server 102 requests the details of the selected task from the relevant primary systems 104, then in step 436, receives those details. In step 438 the chatbot server 102 sends the details to the application 106 in a modified message 250. In step 440, the application 106 displays an interactive representation of the task for the user to process.

The processes described in relation to FIGS. 3B and 4 describe three communications between the chatbot server 102 and the primary systems 104. In the first, corresponding to steps 322, 412 and 414, the chatbot obtains a count of the numbers of outstanding tasks for that day. In the second, corresponding to steps 332, 424 and 426, the chatbot server 102 obtains a summary of or preliminary data for those tasks. In the third, corresponding to steps 338, 434, and 436, the chatbot server 102 obtains the full details of the task selected by the user via the app. In this way, the chatbot server 102 only obtains the minimal data required at the time, thus reducing the data transmission load. It will be understood however that other arrangements are possible. For example, the chatbot may obtain a count and summary data at the first stage, i.e. combining the first and second communications above. The summary data may be stored by the chatbot serve 102 until it is needed. In further examples, the second and third steps may be combined, or all three steps may be combined. It will be understood that the chosen process represents a trade-off between communication steps and data storage. In some examples, the chatbot system 100 may be adapted to assess the data storage available and the communication resources available and choose a process that suits the available resources. In some examples, if the number of tasks from the primary systems 104 is below a threshold, then the second and third stages may be combined such that full data for all tasks is obtained at the second stage and presented to the user as requested without further communication with the primary systems 104. However, in situations where the number of tasks exceeds the threshold, the second and third stages remain separate.

Figure 5:
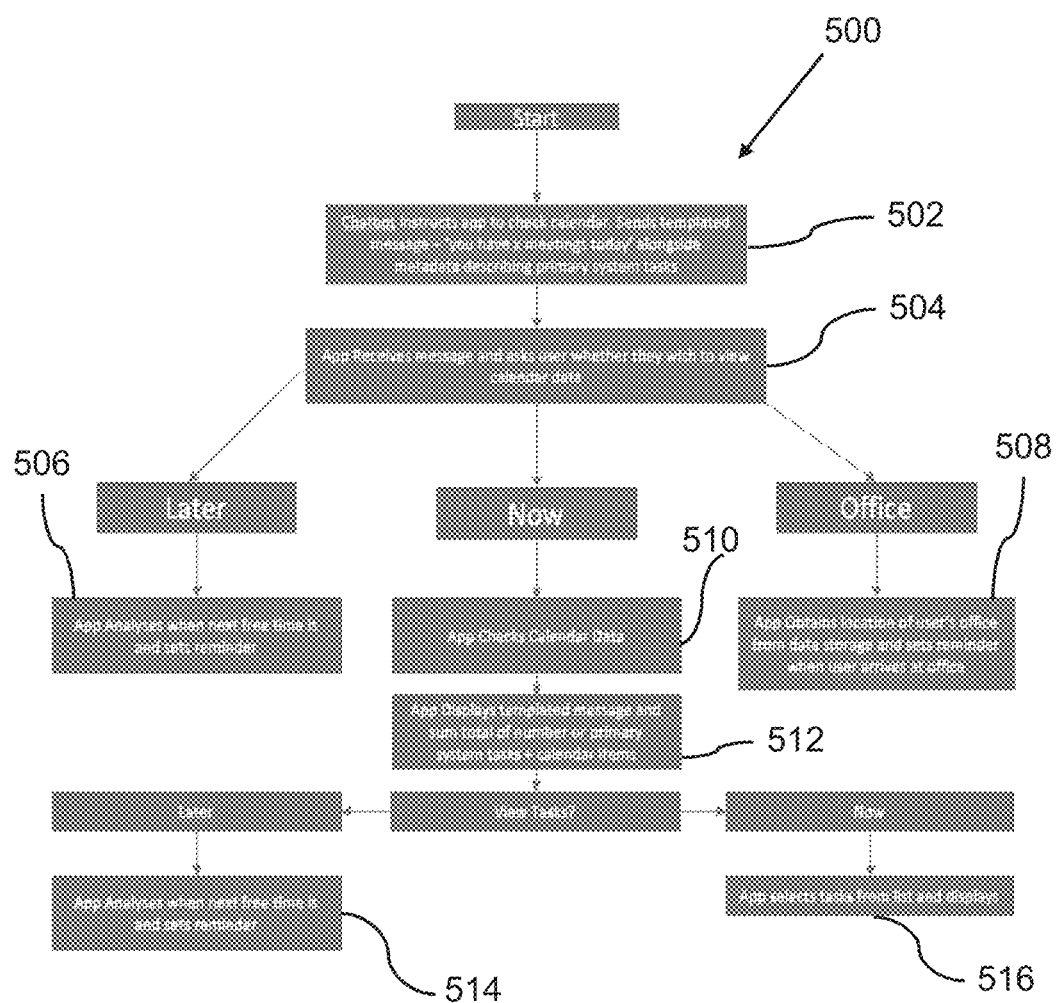
FIG. 5 is a flowchart of an alternative method according to the disclosure.

Referring now to FIG. 5, there is shown a flowchart of an alternative method, indicated generally by the reference numeral 500, of operation of the chatbot system 100 of the disclosure. Instead of the chatbot server 102 receiving the calendar data and storing it for use throughout the day, the calendar data is not transmitted to the chatbot server 102. The method starts at step 502 wherein the chatbot server 102 requests the day's tasks from the primary systems 104, corresponding to step 322 of FIG. 3. The chatbot sends a message to the app 106, instructing it to check calendar data for that data. The chatbot server 102 then sends a modified message 250 to the app 106 comprising the supplementary data relating to the day's tasks and a template text relating to the calendar data. An example template text may read "You have <X> appointments today and 3 tasks.", where the number of tasks has been identified in communications between the chatbot server 102 and the primary systems. In step 504, the app 106 receives the modified message 250 from the chatbot server 102 and displays a greeting message to the user, asking if they'd like to view their appointments and tasks for the day. As per the example described in relation to FIGS. 3A and 3B, the user is presented with three options—"now", "later" and "office". If the user chooses the "later" option, in step 506 the app 106 analyses the calendar data to identify a suitable time at which to remind the user and sets a notification for that time. If the user chooses the "office" option, in step 508, the app 106 obtains the location of the user's office and sets up a notification to remind the user when the device's location services identify that the device 108 is located at the office location. If the user chooses the "now" option, in step 510, the app 106 checks the calendar data. In step 512, the app 106 displays the templated message received from the chatbot server 102, including the number of appointments and tasks for the day. In one example, the message may display a total number, combining the numbers of tasks and appointments. The message asks the user if they would like to view their items for the day. The user is presented with options to view tasks "now" or later". If the "later" option is chosen, in step 514 the app again selects a free time based on the calendar data and sets a notification for that time. If the "later" option is chosen, in step 516, the app 106 displays the tasks to the user. The user may also be presented with an "Office" options, which will function as the previously described "Office".

Figure 6A:
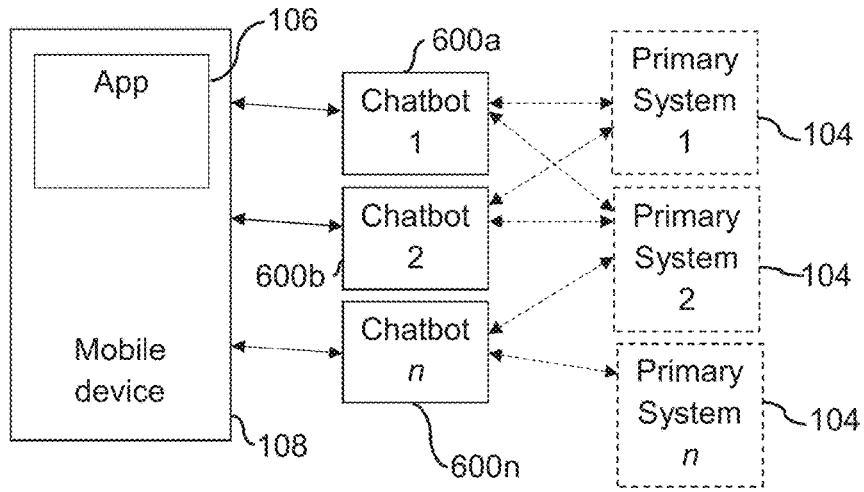
FIG. 6(*a*), 6(*b*) and 6(*c*) are block diagrams of possible chatbot systems according to the disclosure.

Referring now to FIGS. 6(*a*), (*b*) and (*c*), there are shown three potential architectures for the chatbot server 102 of the chatbot system 100. In one embodiment, the chatbot system comprises a single chatbot. As will be explained in more detail below, the chatbot system may comprise two or more chatbots, which two of more chatbots may be in communication with each other. The chatbot system may comprise one or more chatbots each comprising one or more sub-chatbots. Each chatbot or sub-chatbot may have specialised domain expertise, e.g. of relevance to one or more primary system(s). One or more chatbots or sub-chatbots may have domain expertise relevant to personal assistant activities, such as scheduling meetings or notifications, initiating telephone calls, sending emails, attaching documents to emails, or creating a new contact or updating a contact in a primary system. FIGS. 6(*a*), (*b*) and (*c*) relate to specific examples of the arrangement shown in, and in described in relation to, FIG. 1. In each potential architecture, the app 106 on the mobile device 108 is in indirect communication with a plurality of primary systems 104 via a chatbot arrangement on a chatbot server 102. It will be understood that the chatbot server 102 is not limited to the arrangements shown in FIG. 6. The individual chatbots or sub-chatbots may communicate directly or indirectly with each other to share information.

In FIG. 6(*a*) the app 106 communicates with the primary systems 104 by way of a plurality of chatbots 600 on the chatbot server 102. FIG. 6(*a*) shows an arrangement of n individual chatbots 600*a* to 600*n* in communication with n primary systems, however, this is not a requirement and the chatbot may comprise a larger or smaller number of individual chatbots than there are primary systems 104. Each individual chatbot 600 is able to communicate with at least one primary system 104 and may communicate with more than one primary system 104.

Figure 6B:
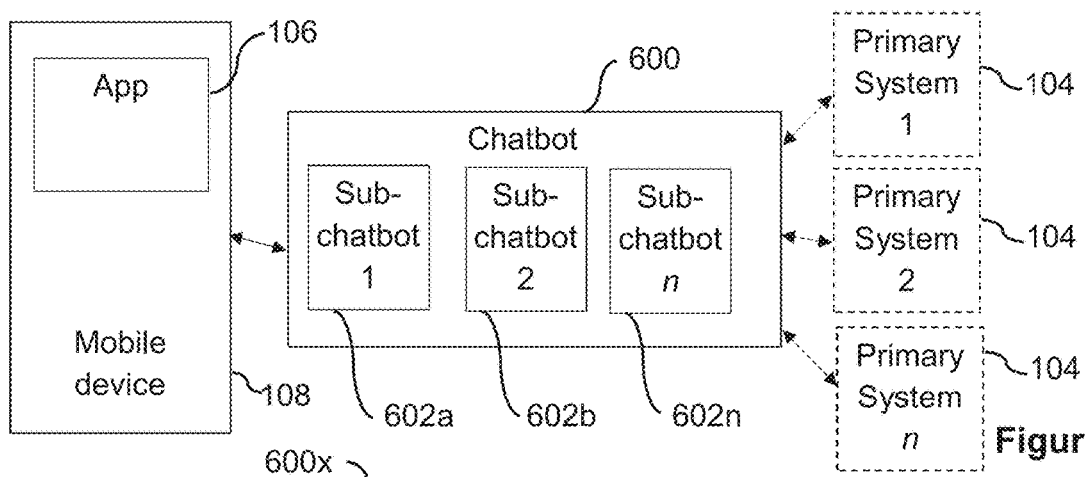

In FIG. 6(b) the app 106 communicates with the primary systems 104 by way of a chatbot 600 comprising a plurality of sub-chatbots 602. FIG. 6(b) shows an arrangement a single chatbot 600 comprising n sub-chatbots 602a, 602b, 602n in communication with n primary systems, however, this is not a requirement and the chatbot server 102 may comprise a larger or smaller number of individual sub-chatbots 602 than there are primary systems 104. Each individual chatbot is able to communicate with at least one primary system 104 and may communicate with more than one primary system. Each sub-chatbot 602 is adapted to handle interactions relating to a specific field or area.

Figure 6C:
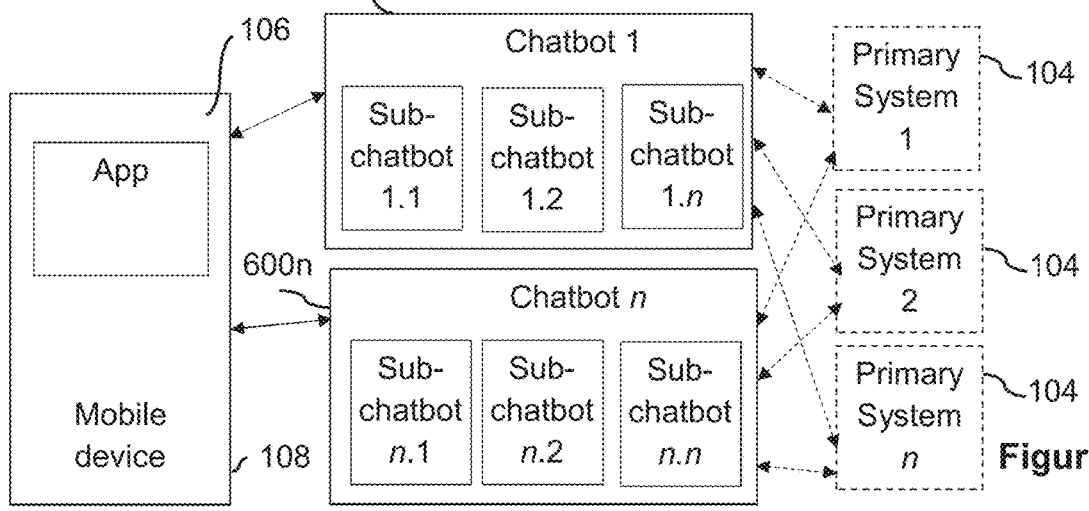

In FIG. 6(c) the app 106 communicates with the primary systems 104 by way of a plurality of chatbots 600, each comprising a plurality of sub-chatbots 602. FIG. 6(c) shows an arrangement of n chatbots 600 each comprising n sub-chatbots 602 in communication with n primary systems, however, it is not a requirement that the number of chatbots, number of sub-chatbots and number of primary systems 104 be equal and the chatbot server 102 may comprise a larger or smaller number of individual sub-chatbots 602 than there are primary systems 104. Typically, each individual chatbot is able to communicate with at least one primary system 104 and may communicate with more than one primary system. However, some chatbots may not be in direct communication with any primary systems, for example, a personal assistant chatbot or a customer services chatbot. Each sub-chatbot 602 is adapted to handle interactions relating to a specific field or area. In a typical example, the chatbot server 102 of the chatbot system 100 may comprise one chatbot 600, which may be referred to as a parent chatbot, with multiple sub-chatbots. In this way, the user may communicate with the parent chatbot about his or her query and thus be directly to the relevant sub-chatbot. Another example may comprise a number of chatbots each with just one sub-chatbot.

Figure 7:
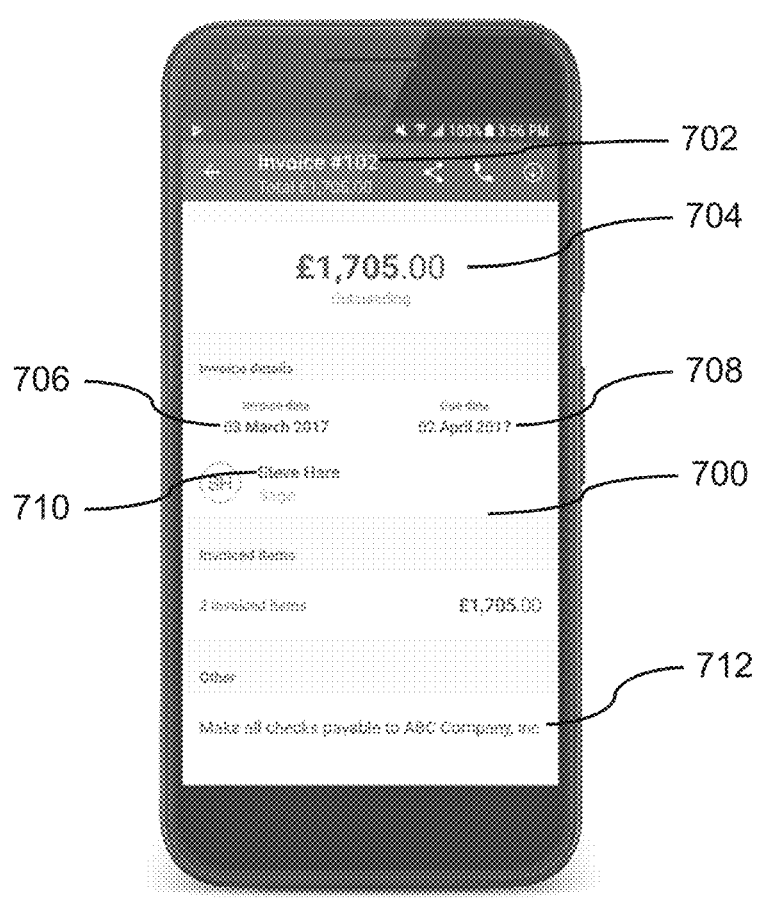
FIG. 7 is a representation of an interactive display of invoice details on an application according to the disclosure.

Referring now to FIG. 7, there is shown an example interactive display of a user-friendly invoice 700 as provided by the application 106 in response to the receipt of the invoice details in a modified message 250 from the chatbot server 102. The display comprises the invoice number 702, the outstanding amount 704, the invoice date 706, the due date 708, the name 710 of the contact person in relation to the invoice, and a 'notes' section 712. By selecting the name of the contact person, the user may be presented with options such as to phone or email the contact, or to set up a new contact in a primary software system. If the user chooses to email the contact, a draft email with suggested wording may be presented to the user for sending.

The step of sending an initial overview message with calendar details may be skipped and a summary from one or more of the primary systems 104 provided without reference to the calendar data.

The chatbot system 100 may comprise an initial set-up or "onboarding" phase, which occurs the first time the user runs the application. This phase does not involve a conversation with the chatbot server 102 as it relates specifically to the application 106. This phase comprises obtaining setup information such as the user's name, office location, and prompting for permission to access native data or functionalities on the user's mobile device, such as camera, calendar, location, and contacts. The user may wish to use the camera to capture receipts for submission to an expenses primary system. The user may wish to use the phone contacts to create new customer entries on a business primary system.

The application 106 can use the information from the supplementary component 260 to provide extra functionality to the chatbot server 102 which is not available to the user is interacting with a chatbot server 102 in a standard channel. The chatbot system 100 may be considered a hybrid of an application or client for a mobile device 108 and a chatbot server 102. The application 106 can be developed to be an extremely "thin" or "light" app such that it does not use up excessive memory or processing power on the mobile device. Substantially all the functionality is located in the chatbot server 102 and the application 106 only needs to provide a conversational UI to the allow the user to converse with the chatbot server 102. The need for the user to frequently download updated versions of the app is mitigated as updates can be achieved by updating the chatbot server 102, with minimal to zero disruption to the user.

The chatbot system 100 is intended to allow for scalable building of mobile apps 106. In an example, the logic sits in the chatbot 600 and the mobile app 106 provides a user interface. Any customisation of the chatbot system 100 may be implemented on the chatbot server 102. This means that new mobile apps can be created and customized by creating new chatbots 600 or modifying existing ones. This provides an architecture and development model that is more scalable than focusing all effort and development on a single mobile app or set of apps. In this way, the client on the user's mobile device is a light or thin app, requiring only limited device resources. Typically, such a thin, or light, app would contain knowledge of how to send device data and user replies to the chatbot, and how to render messages that come back from the bot.

The present invention relates to a chatbot system, a method of operating a chatbot system, a primary system, a mobile application and a method of operation of a mobile application for providing conversational communications between a user and a primary system via chatbot. The communications utilise a modified message comprising a main component and a supplementary component.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An improved chatbot system for accessing at least one remote primary system for storing and processing user data and tasks, the chatbot system comprising:
   a personal mobile communications device;
   a mobile application adapted to be installed on the personal mobile communications device so as to have access to the native functionality and associated data thereof;
   a chatbot server adapted to provide an interface for at least one primary system, wherein the chatbot server communicates with the mobile application using a modified message type, where a modified message of the modified message type sent to the chatbot server from the personal mobile communication device comprises:
   a header, comprising an identifying tag, indicating that the modified message is of the modified message type;
   a main component; and
   a supplementary component,
   wherein each component comprises at least one data element and wherein the supplementary component comprises an instruction to the mobile application to be implemented using native functionality of the mobile device, or data associated with the native functionality of the mobile device.

2. The improved chatbot system as claimed in claim 1 wherein when a modified message of the modified message type is sent by the chatbot server, the supplementary component comprises the instruction to the mobile application to be implemented using the native functionality of the mobile device.

3. The improved chatbot system as claimed in claim 2 wherein the supplementary component comprises an instruction in relation to generating a notification.

4. The improved chatbot system as claimed in claim 3 wherein the instruction relates to generating a notification at a certain time or at a certain location.

5. The improved chatbot system as claimed in claim 1 wherein when a modified message of the modified message type is sent by the mobile application, the supplementary component comprises the data associated with the native function functionality of the mobile device.

6. The improved chatbot system as claimed in claim 1 wherein the supplementary component comprises a metadata data element relating to a data element of the main component.

7. The improved chatbot system as claimed in claim 1 wherein the supplementary component comprises non-text data.

8. The improved chatbot system as claimed claim 1 wherein the supplementary component comprises a JSON data element.

9. The improved chatbot system as claimed in I claim wherein the supplementary component comprises one or more of calendar data, contact data; location data; clock and alarm data; compass data; sensor data; biometric data, image data, device usage data, and device configuration data.

10. The improved chatbot system as claimed in claim 1 wherein the mobile application is a native application.

11. The improved chatbot system as claimed in claim 1 wherein the mobile application is a light app such that the processing for the chatbot system is carried out by the chatbot server.

12. The improved chatbot system as claimed in claim 1 wherein the chatbot system is adapted to communicate via Microsoft Directline API.

13. The improved chatbot system as claimed in claim 1 wherein the chatbot system is a federated chatbot system comprising a parent chatbot and at least one sub-chatbot.

14. The improved chatbot system as claimed in claim 1 wherein the chatbot system comprises two or more chatbots.

15. An improved method of operating a chatbot system for accessing at least one remote primary system for storing and processing user data and tasks, the chatbot system comprising a chatbot server and at least one mobile application installed on a personal mobile communications device so as to have access to native functionality and associated data thereof, wherein the chatbot server is adapted to act as an interface between one or more primary systems and the at least one mobile application, the method comprising:
   the chatbot server receiving a message from the mobile application; and
   the chatbot server identifying a tag on the message indicating that the message is a modified message, the modified message having a header comprising an identifying tag indicating that the modified message is of the modified message type, wherein the modified message comprises a main component and a supplementary component, each component comprising at least one data element and wherein the supplementary component comprises data associated with a native function of the mobile device.

16. The improved method as claimed in claim 15 comprising the chatbot server transmitting a modified message to the mobile application, wherein the supplementary component of the modified message comprises an instruction to the application to be implemented using native functionality of the mobile device.

17. The improved method as claimed in claim 16 comprising the mobile application implementing the instruction from the modified message.

18. The improved method as claimed in claim 15 comprising the mobile application transmitting a modified message to chatbot server wherein the supplementary component comprises the data associated with the native function of the mobile device.

19. A chatbot system comprising:
   a personal mobile communications device;
   a chatbot server; and
   a mobile application configured to provide a user with a conversational interface to the chatbot server for accessing at least one remote primary system for storing and processing user data and tasks, the mobile application being adapted to be installed on the personal mobile communications device so as to have access to native functionality and associated data thereof and to communicate with the chatbot server using messages of a modified message type, wherein a modified message sent from the personal mobile communication device to the chatbot server comprises:
   a header, comprising an identifying tag, indicating that the modified message is of the modified message type;
   a main component; and
   a supplementary component,
   wherein the mobile application is further adapted to identify modified messages on receipt and generate modified messages for transmission and wherein the supplementary component comprises an instruction to the mobile application to be implemented using the native functionality of the personal mobile communication device, or data associated with the native functionality of the personal mobile communication device.

20. The chatbot system as claimed in claim 19 wherein the supplementary component of a received modified message comprises an instruction to the mobile application to be implemented using the native functionality of the mobile device.

21. The chatbot system as claimed in claim 20 wherein the mobile application is adapted to generate a modified message where the supplementary component comprises the data associated with a native functionality of the personal mobile communication device.

22. A method of operation of a mobile application on a mobile device, the mobile application adapted to communicate with a chatbot server, the method comprising:
   creating a message of a modified message type, the modified message comprising a main component and a supplementary component, wherein creating the message comprises:
   adding an identifying tag to the modified message to specify that it is of the modified message type, and
   populating the supplementary component of the message with data associated with a native function of the mobile device;
   transmitting the modified message to the chatbot server;
   receiving a message from the chatbot server; and
   checking for a modified message identifying tag on the received message, and if present, processing the supplementary component of the received message.

23. The method as claimed in claim 22 wherein the supplementary component of the received message comprises an instruction to the application to be implemented using native functionality of the mobile device, and the method comprising the mobile application implementing the instruction.

* * * * *